US008117909B1

(12) United States Patent
LaClair et al.

(10) Patent No.: US 8,117,909 B1
(45) Date of Patent: Feb. 21, 2012

(54) ICING RESISTANT SENSOR PORT FOR A FUEL TANK ENVIRONMENT

(75) Inventors: Robert Downing LaClair, Richmond, VT (US); Robert L. Zeliff, Bridport, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 958 days.

(21) Appl. No.: 12/080,991

(22) Filed: Apr. 8, 2008

(51) Int. Cl.
*G01W 1/00* (2006.01)
(52) U.S. Cl. ..................................... 73/170.26; 244/134
(58) Field of Classification Search ................. 73/432.1, 73/170.26
See application file for complete search history.

(56) References Cited

U.S. PATENT DOCUMENTS

| 5,724,187 A * | 3/1998 | Varaprasad et al. .......... 359/608 |
| 5,752,674 A * | 5/1998 | Mears et al. .............. 244/134 R |

* cited by examiner

*Primary Examiner* — Hezron E Williams
*Assistant Examiner* — Gregory J Redmann
(74) *Attorney, Agent, or Firm* — Muirhead and Saturnelli, LLC

(57) ABSTRACT

A system for an icing resistant sensor port assembly includes shaped and patterned features for resisting the formation and propagation of ice around a sensor port, such as for a pressure sensor in an aircraft fuel tank. Water may be present in fuel tanks due to condensation and other factors. The water, being heavier than fuel, such as jet fuel, sinks to the bottom of the tank and may be present around the sensor port. If the water completely fills the pressure port, it may damage the sensor. In various embodiments, an inlet assembly having a cone-shaped countersink, sharp edges that reduce surface area, anti-wetting coatings, and slots to allow fluid flow within the inlet assembly, among other features, may be used to help resist ice formation and propagation around a sensor port.

25 Claims, 4 Drawing Sheets

FIG. 3
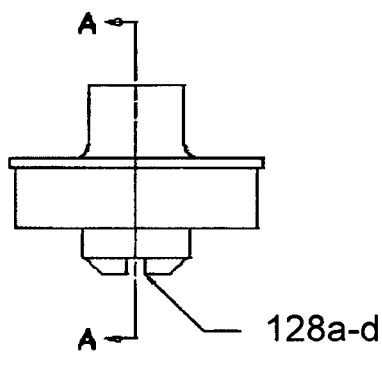
FIG. 4
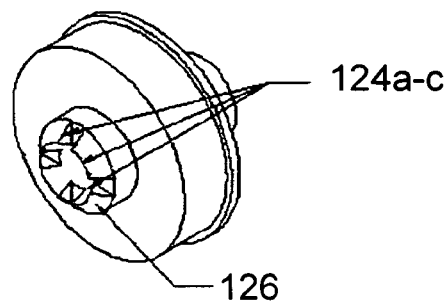
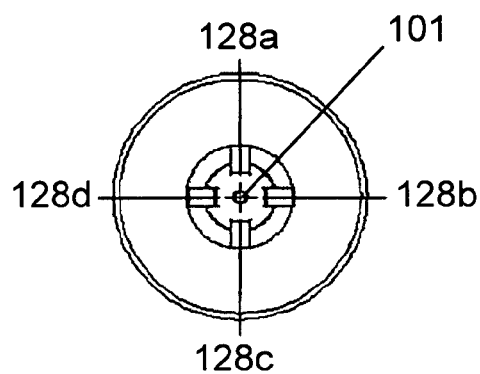
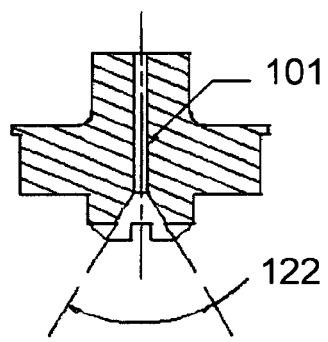
SECTION A-A
FIG. 5
FIG. 6

ICING RESISTANT SENSOR PORT FOR A FUEL TANK ENVIRONMENT

TECHNICAL FIELD

This application relates to the field of icing resistance and, more particularly, to resisting the formation and propagation of ice in components.

BACKGROUND OF THE INVENTION

Water may be present in fuel tanks due to condensation and other factors. The water, being heavier than fuel may sink to the bottom of the tank and may be present around the port of a sensor, such as a pressure sensor. In the case of a pressure sensor, if the water completely fills the sensor port, it may damage the pressure sensor diaphragm when the water freezes due to the expansion properties of ice. Of course, such damage can occur to other types of sensors and components. A sensor damaged in such a manner may stop working and/or become unreliable.

Accordingly, it would be desirable to provide a system that resists the formation and propagation of ice in and around sensor ports and/or other components.

SUMMARY OF THE INVENTION

According to the system described herein, a sensor port device for resisting formation and propagation of ice around a sensor port includes an inlet assembly having a shaped volume that resists ice plug formation. A plurality of edges are disposed on the inlet assembly, wherein the edges have small surface areas that resist ice formation. A plurality of openings are disposed in the inlet assembly that provide for fluid flow around the sensor port. The shaped volume may include a cone shape. An anti-wetting film may be disposed on at least one surface of the inlet assembly or over all surfaces of the inlet assembly. A screen may be disposed in the inlet assembly over the sensor port. The plurality of openings may include pairs of openings disposed across the inlet assembly from one another. A base assembly may be coupled to the inlet assembly that attaches the inlet assembly over the sensor port. The sensor port may be a port of a pressure sensor.

According further to the system described herein, a method of resisting formation and propagation of ice around a sensor port includes disposing an inlet assembly over the sensor port, wherein the inlet assembly has a shaped volume that resists ice plug formation. A plurality of edges may be disposed on the inlet assembly, wherein the edges have small surface areas that resist ice formation. A plurality of openings may be disposed in the inlet assembly that provide for fluid flow around the sensor port. The shaped volume may be a cone shape. An anti-wetting film may be applied on at least one surface of the inlet assembly or over all surfaces of the inlet assembly. A screen may be disposed over the sensor port. The plurality of openings may include pairs of openings disposed across the inlet assembly from one another. The inlet assembly may be attached over the sensor port. The sensor port may be a port of a pressure sensor.

According further to the system described herein, a sensor system includes a sensor with a sensor port and an icing resistant sensor port device disposed over the sensor port. The icing resistant sensor port device includes an inlet assembly having a shaped volume that resists ice plug formation. A plurality of edges may be disposed on the inlet assembly, wherein the edges have small surface areas that resist ice formation. A plurality of openings may be disposed in the inlet assembly that provide for fluid flow around the sensor port. The sensor may be a pressure sensor. The shaped volume may be a cone shape. An anti-wetting film may be disposed on at least one surface of the inlet assembly or over all surfaces of the inlet assembly. A screen may be disposed in the inlet assembly over the sensor port. The plurality of openings may include pairs of openings disposed across the inlet assembly from one another. A base assembly may be coupled to the inlet assembly that attaches the inlet assembly over the sensor port. The sensor system may be coupled to an aircraft fuel tank.

BRIEF DESCRIPTION OF THE DRAWINGS

Embodiments of the system are described with reference to the several figures of the drawings, in which:

FIG. 3 is a side view of the icing resistant sensor port assembly shown in FIG. 2.

FIG. 4 is another perspective view of the icing resistant sensor port assembly shown in FIG. 2.

FIG. 5 is an end view of the icing resistant sensor port assembly shown in FIG. 2.

FIG. 6 is a cross-sectional view of the icing resistant sensor port assembly shown in FIG. 2.

DETAILED DESCRIPTION OF VARIOUS EMBODIMENTS

Referring now to the figures of the drawings, the figures comprise a part of this specification and illustrate exemplary embodiments of the described system. It is to be understood that in some instances various aspects of the system may be shown schematically or may be altered to facilitate an understanding of the system.

Figure 1:
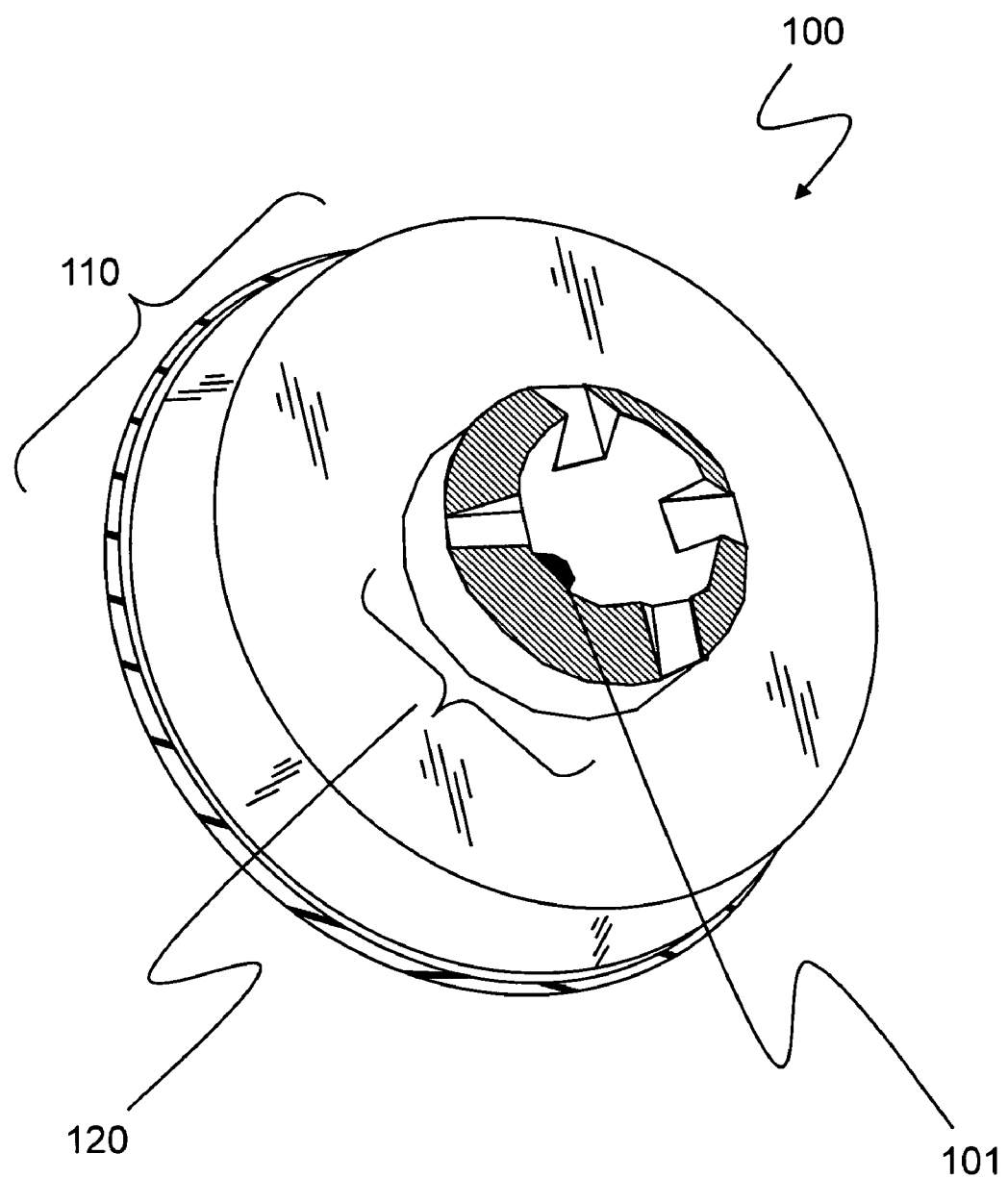
FIG. 1 is a perspective illustration of an icing resistant sensor port assembly applied over a sensor port according to an embodiment of the system described herein.

FIG. 1 is a perspective illustration of an icing resistant sensor port assembly 100 applied over a sensor port 101 according to an embodiment of the system described herein. In an embodiment, the sensor port 101 may be a port of a pressure sensor. The sensor port assembly 101 may include a base assembly 110 for attaching the sensor port assembly 100 over the sensor port 101 in a fuel tank and may include an inlet assembly 120 disposed over the inlet of the sensor port 101. The base assembly 110 may include suitable attachment mechanisms for positioning the sensor port assembly 100 in the area of the sensor port 101 and vary according to design configurations of the sensor and/or the fuel tank in which the sensor is disposed. The inlet assembly 120 of the sensor port assembly 100 may include multiple features that contribute to ice exclusion and resistance to formation and propagation in and around the sensor port 101, as further described elsewhere herein.

Figure 2:
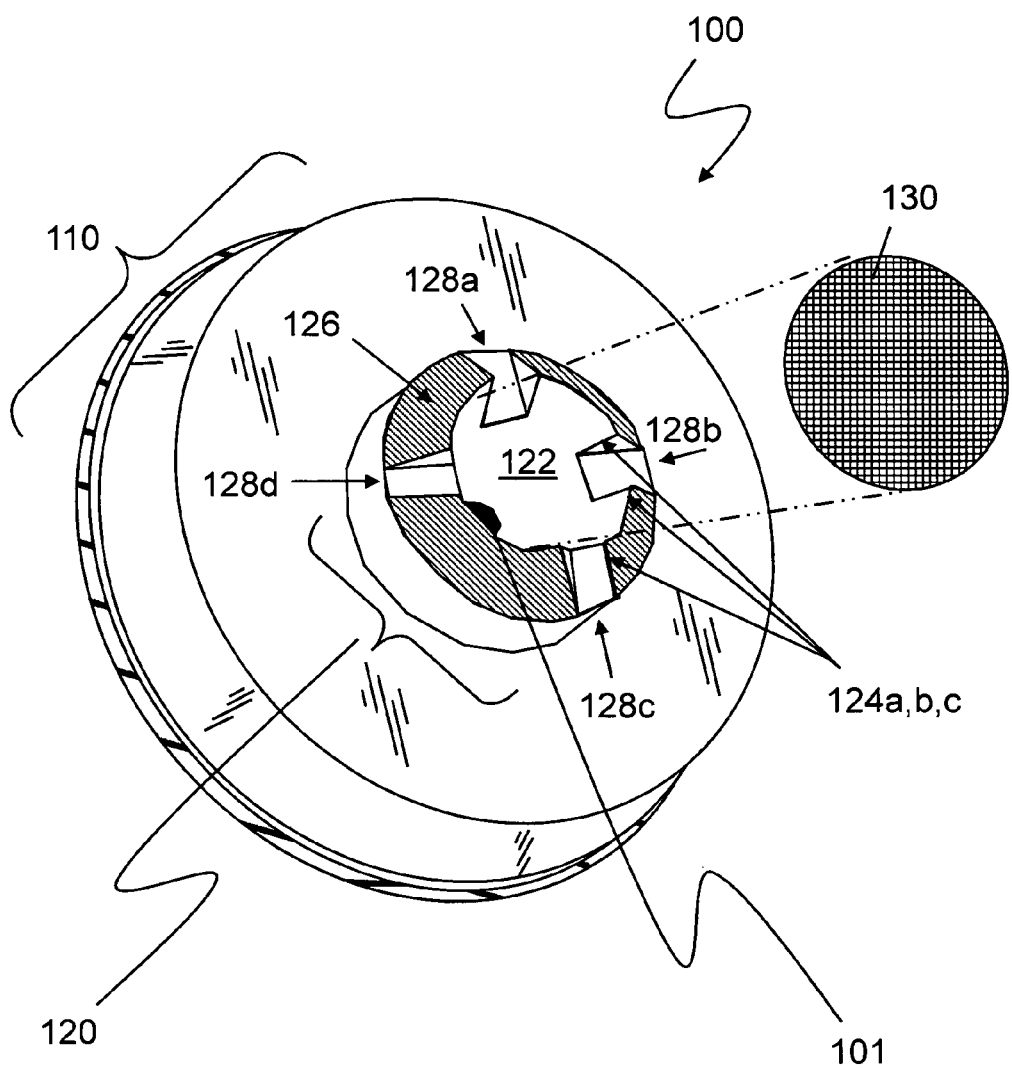
FIG. 2 is another perspective illustration of an icing resistant sensor port assembly identifying detailed components according to various embodiments of the system described herein.

FIG. 2 is another perspective illustration of the sensor port assembly 100 showing components of the assembly in more detail according to various embodiments of the system described herein. In an embodiment, an inlet assembly 120 may have a geometry that forms a conical countersink 122 that may tend to reject or push out an ice plug when formed as water freezes (see also FIG. 6). Ice that forms as the water freezes expands in the conical countersink 122 and causes an increase in cone diameter at points of the geometry. Consequently, a force vector component drives the cone-shaped ice plug from the cone-shaped countersink helping to eject the ice plug from the area of the sensor port 101.

In another embodiment, facets of the cone geometry of the inlet assembly 120 may have sharp edges with very little surface area. Examples of the sharp edges on the inlet assembly 120 are illustrated as edges 124a,b,c, and other edges in addition to those shown may also be designed to reduce surface area. As a result, it is difficult for ice to form on the sharp edges 124a-c. Additionally, one or more, or all, of the surfaces of the inlet assembly 120 may be coated with a film 126 of a moisture-proof material which prevents wetting by any of the fuel constituents, including water. Any appropriate moisture-proof material may be used, including any one or more of a number conventional, well-known, waterproof materials. If no water is present on the surface of the device, then no ice can form there (see also FIG. 4).

In another embodiment, four radial slots 128a,b,c,d may be present on the inlet assembly 120 to allow flow across the sensor port 101 (see, for example, FIGS. 3 and 5). Fluid motion in the tank may be created by natural thermal convection and mechanical motion, for example as in an aircraft. The fluid motion through the radial slots 128a-d may help to clear ice and other debris from the area surrounding the inlet of the sensor port 101.

Additionally, in another embodiment, a screen and/or grill 130 may be disposed with the inlet assembly 120 over the inlet of the sensor port 101 to catch debris and to form a structure to which water may attach and thereby intercept the water before it enters the sensor port 101.

FIG. 3 is a side view of the icing resistant sensor port assembly 100 shown in FIG. 2. The four radial slots 128a-d allow flow through the inlet assembly 120 and across the sensor port 101 to allow for ice and debris removal. The four radial slots 128a-d are shown in a rectilinear position with the slot 128a across from the slot 128c and the slot 128b across from the slot 128d such that the fluid may flow across from one slot to the opposite slot therefrom. The shape of the radial slot may be designed to optimize fluid flow through the inlet assembly 120.

FIG. 4 is another perspective view of the icing resistant sensor port assembly 100 shown in FIG. 2. Sharp edges of the inlet assembly 120, such as edges 124a-c, have very little surface area which helps to prevent the formation and propagation of ice. Additionally, the anti-wetting film 126 that may be applied to one or more of the surfaces of the inlet assembly 120 also may help prevent the formation and propagation of ice.

FIG. 5 is an end view of the icing resistant sensor port assembly shown in FIG. 2. The radial slots 128a-d are shown disposed on the inlet assembly 120 around the sensor port 101. Although four radial slots are illustrated, other numbers of radial slots may be used in connection with the system described herein that allow for fluid flow through the inlet assembly 120 and across the sensor port 101 to remove ice and debris from the area of the sensor port 101.

FIG. 6 is a cross-sectional view of the icing resistant sensor port assembly shown in FIG. 2. The cross-sectional view is along the line A-A shown in FIG. 3. The sensor port 101 is shown extending through the base assembly 110 to the inlet assembly 120. The cone shape countersink 122 of the inlet assembly 120 inhibits ice plug formation by facilitating rejection of an ice plug as ice, which expands as the water freezes, is driven out of the inlet assembly by a force vector component resulting from design of the cone-shaped countersink 122. That is, as the ice plug forms and expands, the cone shape causes the ice plug to move away from the inlet.

Figure 7:
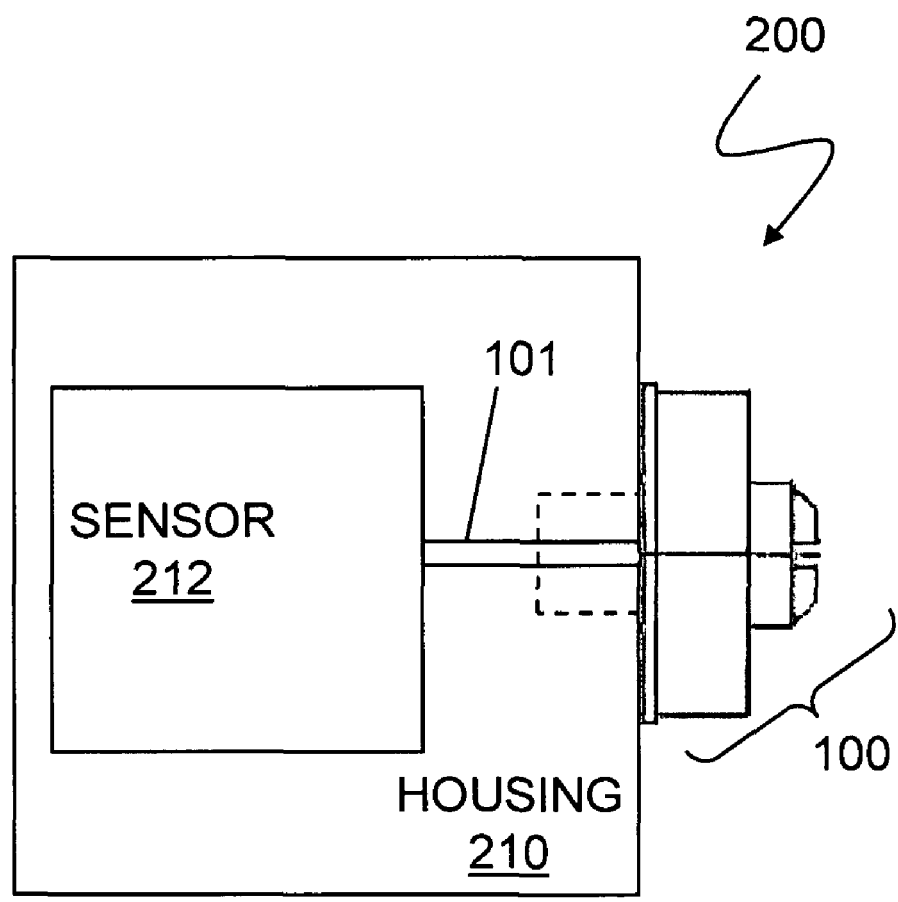
FIG. 7 is a schematic illustration of a sensor system including a sensor and an icing resistant sensor port assembly according to an embodiment of the system described herein.

FIG. 7 is a schematic illustration of a sensor system 200 including a sensor housing 210 and an icing resistant sensor port assembly 100 according to an embodiment of the system described herein. The icing resistant sensor port assembly 100, including components discussed elsewhere herein, may be positioned over the sensor port 101 that may be coupled to a sensor 212 encased by the housing 210. For example, the sensor 212 may be a pressure sensor that includes a pressure sensing diaphragm. Note that the sensor port assembly 100 may be integrated with the housing 210 at the time of manufacture and/or may be a separate assembly that is separately attached. The sensor system 200 may be disposed in a fuel tank, such as an aircraft fuel tank. The housing 210 and the sensor 212 may include other suitable components for measuring, analyzing and transmitting sensor information.

As further discussed elsewhere herein, shapes and patterns for the inlet assembly 120 other than those illustrated may be used in connection with the system described herein to resist the formation and propagation of ice around the sensor port 101. For example, more or less than four radial slots may be used and the radial slots may be disposed in a pattern other than a rectilinear pattern to facilitate fluid flow through the inlet assembly in various environments that experience different types of mechanically-induced and/or thermally-induced fluid motion. Moreover, for example, the shapes of the slots may be configured differently to facilitate fluid flow through the inlet assembly. Additionally, other shapes that may be advantageously configured with sharp edges and to otherwise limit surface area may be used in connection with the system described herein to help in resisting ice formation and propagation.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A sensor port device for resisting formation and propagation of ice around a sensor port, comprising:
    an inlet assembly having a shaped volume that resists ice plug formation, wherein a shape of the shaped volume causes application of a force vector component to ice that forms within the shaped volume to eject the ice away from the inlet assembly;
    a plurality of edges disposed on the inlet assembly, wherein the edges have small surface areas that resist ice formation; and
    a plurality of openings disposed in the inlet assembly that provide for fluid flow across the shaped volume of the inlet assembly, wherein the fluid flow provided by the plurality of openings causes removal of the ice ejected by the shaped volume.

2. The sensor port device according to claim 1, wherein the shaped volume is a cone shape.

3. The sensor port device according to claim 1, further comprising:
    an anti-wetting film that is disposed on at least one surface of the inlet assembly.

4. The sensor port device according to claim 3, wherein the anti-wetting film is disposed over all surfaces of the inlet assembly.

5. The sensor port device according to claim 1, further comprising:
a screen disposed in the inlet assembly over the sensor port.

6. The sensor port device according to claim 1, wherein the plurality of openings include pairs of openings disposed across the inlet assembly from one another that enables the fluid flow across the shaped volume to remove the ice ejected from the shaped volume.

7. The sensor port device according to claim 1, further comprising:
a base assembly coupled to the inlet assembly that attaches the inlet assembly over the sensor port.

8. The sensor port device according to claim 1, wherein the sensor port is a port of a pressure sensor.

9. A method of resisting formation and propagation of ice around a sensor port, comprising:
disposing an inlet assembly over the sensor port, wherein the inlet assembly has a shaped volume that resists ice plug formation, wherein a shape of the shaped volume causes application of a force vector component to ice that forms within the shaped volume to eject the ice away from the inlet assembly;
disposing a plurality of edges on the inlet assembly, wherein the edges have small surface areas that resist ice formation; and
disposing a plurality of openings in the inlet assembly that provide for fluid flow across the shaped volume of the inlet assembly, wherein the fluid flow provided by the plurality of openings causes removal of the ice ejected by the shaped volume.

10. The method according to claim 9, wherein the shaped volume is a cone shape.

11. The method according to claim 9, further comprising:
applying an anti-wetting film on at least one surface of the inlet assembly.

12. The method according to claim 11, wherein the anti-wetting film is applied over all surfaces of the inlet assembly.

13. The method according to claim 9, further comprising:
disposing a screen over the sensor port.

14. The method according to claim 9, wherein the plurality of openings include pairs of openings disposed across the inlet assembly from one another that enables the fluid flow across the shaped volume to remove the ice ejected from the shaped volume.

15. The method according to claim 9, further comprising:
attaching the inlet assembly over the sensor port.

16. The method according to claim 9, wherein the sensor port is a port of a pressure sensor.

17. A sensor system, comprising:
a sensor including a sensor port; and
an icing resistant sensor port device disposed over the sensor port, wherein the icing resistant sensor port device includes:
an inlet assembly having a shaped volume that resists ice plug formation, wherein a shape of the shaped volume causes application of a force vector component to ice that forms within the shaped volume to eject the ice away from the inlet assembly;
a plurality of edges disposed on the inlet assembly, wherein the edges have small surface areas that resist ice formation; and
a plurality of openings disposed in the inlet assembly that provide for fluid flow across the shaped volume of the inlet assembly, wherein the fluid flow provided by the plurality of openings causes removal of the ice ejected by the shaped volume.

18. The sensor system according to claim 17, wherein the sensor is a pressure sensor.

19. The sensor system according to claim 17, wherein the shaped volume is a cone shape.

20. The sensor system according to claim 17, further comprising:
an anti-wetting film that is disposed on at least one surface of the inlet assembly.

21. The sensor system according to claim 20, wherein the anti-wetting film is disposed over all surfaces of the inlet assembly.

22. The sensor system according to claim 17, further comprising:
a screen disposed in the inlet assembly over the sensor port.

23. The sensor system according to claim 17, wherein the plurality of openings include pairs of openings disposed across the inlet assembly from one another that enables the fluid flow across the shaped volume to remove the ice ejected from the shaped volume.

24. The sensor system according to claim 17, further comprising:
a base assembly coupled to the inlet assembly that attaches the inlet assembly over the sensor port.

25. The sensor system according to claim 17, wherein the sensor system is coupled to an aircraft fuel tank.

* * * * *